(No Model.)

O. W. HOUSER.
FAST AND LOOSE PULLEY.

No. 531,942. Patented Jan. 1, 1895.

Inventor
O. W. Houser
By Alexander Davis
Attorneys

Witnesses

UNITED STATES PATENT OFFICE.

OLIVER W. HOUSER, OF BURLINGAME, PENNSYLVANIA.

FAST AND LOOSE PULLEY.

SPECIFICATION forming part of Letters Patent No. 531,942, dated January 1, 1895.

Application filed October 15, 1894. Serial No. 526,940. (No model.)

*To all whom it may concern:*

Be it known that I, OLIVER W. HOUSER, a citizen of the United States, residing at Burlingame, in the county of Lycoming and State of Pennsylvania, have invented certain new and useful Improvements in a Combined Fast and Loose Pulley, of which the following is a specification, reference being had therein to the accompanying drawings.

This invention relates to a new and improved combined fast and loose pulley; and it has for its object to provide a pulley of simple construction which will be durable, and which may be readily secured on or removed from a shaft, and which while in position on the shaft may be readily changed from a fast to a loose pulley without removing it therefrom.

The invention consists in the novel combination and arrangement of parts hereinafter described and particularly pointed out in the claims appended.

Figure 1:
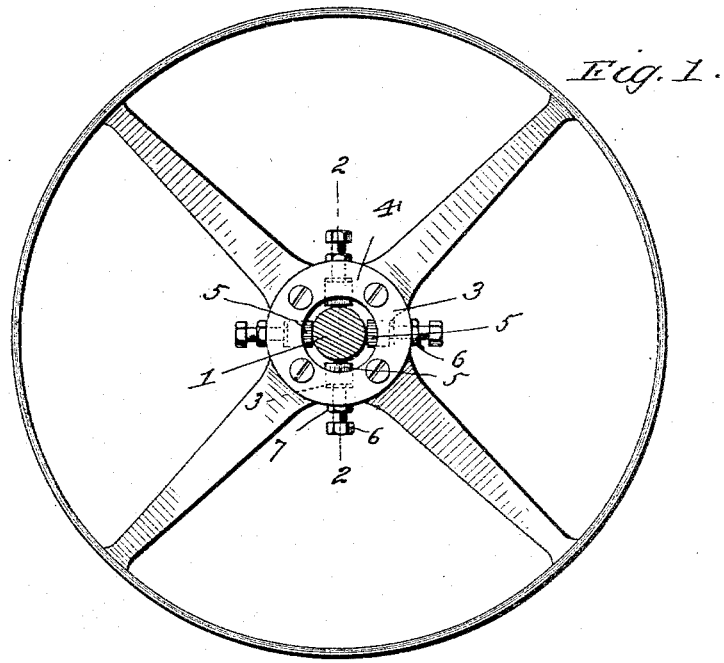
Figure 2:
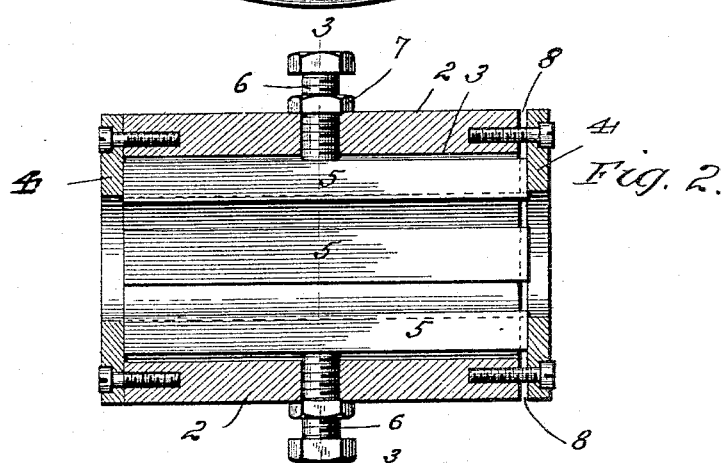
Figure 3:
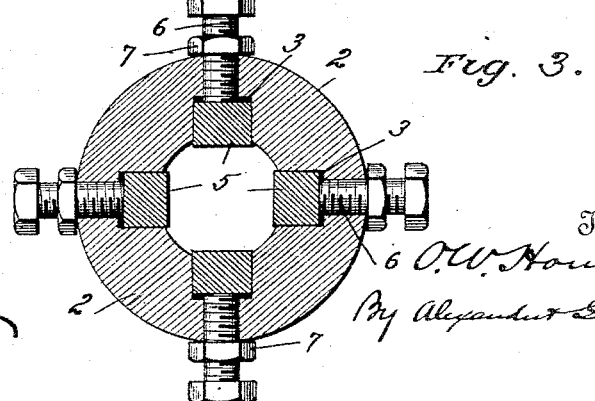

In the drawings:—Figure 1 is a side elevation of a pulley embodying my invention; Fig. 2, a vertical sectional view of the hub thereof on line 2—2 of Fig. 1, and Fig. 3 a cross-sectional view of the hub on line 3—3 of Fig. 2.

Referring to the various parts by numerals, 1 designates a shaft, shown in cross-section in Fig. 1, and 2 the pulley hub. Formed around the shaft opening of the hub are a series of radial longitudinal grooves 3 whose inner sides open into the shaft-opening as shown. These grooves extend entirely through the hub, as shown, their outer ends being closed by removable clamping rings 4, and 4ᵃ. They are formed equal distances apart, and fitted in them are keys or gibs 5. These gibs or keys are radially adjustable by means of radial clamping-screws 6 which are tapped through the hub, their inner ends bearing on the outer surfaces of the keys. The screws 6 are provided with lock-nuts 7 by means of which said screws are secured in their adjusted positions.

The keys or gibs 5 are slightly longer than the hub 2, and, as shown in Fig. 2, when one of their ends abuts against the clamping ring 4, which is screwed tightly against the hub of the pulley, their other ends project slightly beyond the other end of the hub, as shown at 8 in Fig. 2. By means of this construction, when the gibs or keys are adjusted either against a shaft or loosened therefrom, the ring 4ᵃ is clamped hard against the projecting ends of the gibs and securely holds them in their adjusted positions, and against any lateral or longitudinal movement. When it is desired to readjust the gibs it is necessary to loosen the ring 4ᵃ and then adjust them by means of the screws 6. When so adjusted the ring 4ᵃ may be again tightened on them.

From the foregoing it will be readily seen that my device is simple and efficient by means of which the pulley may be securely fastened to a shaft, or it may be loosely secured thereon and serve as a loose pulley.

I desire it understood that I do not limit myself to the exact construction and arrangement of parts herein described as various changes may be made without departing from the scope of the invention.

Having thus fully described my invention, what I claim is—

1. A combined fast and loose pulley, consisting of a pulley provided with longitudinal grooves arranged around its shaft opening, gibs fitted in said grooves, means for radially adjusting said gib, and means for positively clamping said gibs in their adjusted positions, substantially as described.

2. A combined fast and loose pulley consisting of a pulley provided with radial longitudinal grooves arranged around the shaft opening, gibs fitting in said grooves, means for radially adjusting the gibs, and means carried by the pulley for endwise clamping the gibs to prevent movement of said gibs, substantially as described.

3. A combined fast and loose pulley consisting of a pulley provided with a hub formed with longitudinal radial grooves arranged around the shaft-opening, gibs fitted in said grooves, one end of each of said gibs extending slightly beyond one end of its groove, and a clamping device carried by the pulley and bearing on the exposed ends of the gibs and clamping them longitudinally, and means for adjusting the gibs radially, substantially as described.

4. A fast and loose pulley consisting of a pulley formed with a hub having longitudinal radial grooves arranged around its shaft opening, gibs or keys arranged in said grooves, means for adjusting said gibs radially, rings adapted to be removably secured to the ends of the hub to close the open ends of the grooves and clamp the gibs longitudinally to prevent lateral or end-wise movement thereof, substantially as described.

In testimony whereof I affix my signature in presence of two witnesses.

OLIVER W. HOUSER.

Witnesses:
H. T. AMES,
T. H. HAMMOND.